United States Patent [19]
Stephenson et al.

[11] Patent Number: 5,935,528
[45] Date of Patent: Aug. 10, 1999

[54] MULTICOMPONENT FLUID FEED APPARATUS WITH PREHEATER AND MIXER FOR A HIGH TEMPERATURE CHEMICAL REACTOR

[75] Inventors: Michael J. Stephenson, Oak Ridge; Paul A. Haas, Knoxville; David A. Everitt, Oak Ridge, all of Tenn.

[73] Assignee: Molten Metal Technology, Inc., Fall River, Mass.

[21] Appl. No.: 08/783,512

[22] Filed: Jan. 14, 1997

[51] Int. Cl.⁶ ..................................................... C01G 43/02
[52] U.S. Cl. ........................ 422/159; 422/199; 423/253; 423/260; 423/261; 252/636; 360/178.1
[58] Field of Search ............................ 422/159, 173–174, 422/198–199; 423/260–261, 253, 659; 588/19; 252/636; 366/146, 178.1, 178.2, 178.3; 48/86 R

[56] References Cited

U.S. PATENT DOCUMENTS

| | | | |
|---|---|---|---|
| 3,796,672 | 3/1974 | Dada et al. | 423/261 |
| 3,978,194 | 8/1976 | Knudgen et al. | 423/261 |
| 4,005,042 | 1/1977 | Dada | 423/260 |
| 4,031,029 | 6/1977 | Colter et al. | 423/260 |
| 4,897,089 | 1/1990 | Quang et al. | 48/86 R |

*Primary Examiner*—Hien Tran
*Attorney, Agent, or Firm*—Robert M. Poteat

[57] ABSTRACT

A multicomponent fluid feed apparatus is disclosed that independently preheats and then mixes two or more fluid streams being introduced into a high temperature chemical reactor to promote more rigorous and complete reactions using assemblies of inert tubular elements and an integral mixing orifice plate. The design allows use of ceramic and speciality alloy materials for high temperature service with particularly corrosive halide feeds such as $UF_6$ and HF. Radiant heat transfer to the tubular elements from external means gives the necessary system high temperatures without excessive temperatures to cause material failure. Preheating of the gaseous reactants in a separate step prior to mixing and injecting the gaseous reactants into a high temperature chemical reactor was found to provide an improved thermal conversion of $UF_6$ to uranium oxides.

14 Claims, 4 Drawing Sheets

5,935,528

MULTICOMPONENT FLUID FEED APPARATUS WITH PREHEATER AND MIXER FOR A HIGH TEMPERATURE CHEMICAL REACTOR

TECHNICAL FIELD

The present invention is particularly useful for the feed to a high temperature thermal reactor for the conversion of uranium hexafluoride ($UF_6$) to solid uranium oxides and hydrogen fluoride (HF). The single-step process for reaction of $UF_6$ is described in U.S. patent application Ser. No. 08/635,190 filed Apr. 19, 1996 and the contents of that application are incorporated herein by reference. The invention would be useful for other chemical reactors with part or all of the same requirements.

BACKGROUND TO THE INVENTION

Certain chemical processes requires the operation of the high temperature chemical reactors to exploit more favorable chemical thermodynamics and kinetics. The conversion of $UF_6$ to $UO_2$, for example, requires the chemical reactor operation to around 800 to 900° C. The feed gases must be well mixed to ensure a homogeneous chemical system and uniform product distribution.

Representative of these prior art techniques, and in addition to those cited in copending Ser. No. 08/635,190, above, is a first patent, U.S. Pat. No. 3,796,672 entitled "Process for Producing Uranium Dioxide Rich Compositions from Uranium Hexafluoride." This patent discloses the conversion of uranium hexafluoride to uranium dioxide in the presence of an active flame in a reaction zone by separately introducing a gaseous reactant comprising a reducing gas and a gaseous reactant of a mixture of uranium hexafluoride and an oxygen-containing carrier gas. A shielding gas is critical to the successful thermal conversion process; it insures that the reactants are temporarily separated and prevented from substantial mixing and reacting until sufficient cross diffusion occurs.

Other patents include U.S. Pat. No. 4,005,042 entitled "Process for Producing Uranium Rich Compositions from Uranium Hexafluoride Using Fluid Injection in the Post Oxidation Step" and U.S. Pat. No. 4,031,029 entitled "Process for Producing Uranium Rich Compositions from Uranium Hexafluoride Using Fluid Injection in the Post Oxidation Step." These patents cover certain improvements in the uranium hexafluoride thermal conversion process; namely, the step of introducing an atomized fluid having a high latent heat of evaporation into either the reaction zone or into the gaseous reactant's stream which is converted to a gas and cools the materials in the reactor. None of the gaseous feed systems disclosed in these patents preheats the gaseous reactant streams prior to mixing of these streams in the flame reactor; nor do they provide for an efficient way to mix the multiple reactant gaseous streams.

The high temperature conversion of $UF_6$ is complicated by the extreme reactivity of $UF_6$ at the prerequisite temperatures of the $UF_6$ reactor. In this case, it is desirable to operate the reactor at the highest temperature allowable by the particular materials of construction without any temperature in the system exceeding the maximum service temperature of the materials of construction. High temperature and corrosive feeds together pose severe process conditions that greatly restrict the materials of construction to special ceramics and certain metal alloys that are difficult to fabricate into a conventional feed apparatus. For example, suitable materials of construction for fabrication of a high temperature $UF_6$ apparatus are generally limited to certain ceramic materials such as high density alumina ($Al_2O_3$), calcium fluoride ($CaF_2$), yttria stabilized zirconia ($ZrO_2$), lanthanum hexaboride ($LaB_6$), and spinel ($MgO \cdot Al_2O_3$). The essential requirement for the selection of a $UF_6$ material is the formation of a stable protective fluoride film. Alumina, for example, forms $AlF_3$ in the presence of $UF_6$. $AlF_3$ is stable at service temperatures up to 1000° C. and is, therefore, suitable for the high temperature $UF_6$ application below the maximum service temperature. Feed materials suitable for high temperature steam and hydrogen include the ceramics listed above in addition to certain nickel-based metal alloys. A complication with the use of ceramic materials is the lack of practical manufacturing techniques for the fabrication of the specialized shapes and forms other than tubes and flat plates. Another complication is the mechanical sealing of the mating surfaces of the parts of the feed system for environmental confinement of the process gases.

One objective of this invention is to provide a superior high temperature feed apparatus with preheater and integral mixer with only tubular and flat plate elements without critical joints or seals exposed to the feeds at high temperatures.

Another objective is to assure introduction and mixing of the feeds at well defined locations within the chemical reactor, under specific conditions, and with sufficient energy to ensure near optimum homogeneous conditions for efficient reaction to final product(s).

Another objective is to provide a controlled temperature of preheat while limiting the maximum temperatures so that the apparatus materials properties (corrosion, strength, vapor pressure, etc.) are within allowable service values for dependable use.

Still a further object is to provide an improved process for the high temperature conversion of $UF_6$ to uranium oxides.

Other and further objects of the present invention will become apparent to a person skilled in the art from a reading of following preferred embodiments and appended claims and by reference to the accompanying drawings described hereinafter.

SUMMARY OF THE INVENTION

The present invention comprises a novel multicomponent fluid feed apparatus for preheating and then mixing two or more fluid streams being injected into a high temperature chemical reactor. The multicomponent feed apparatus includes an inner tubular flow member having first and second ends; the first end thereof is disposed for receiving one of the two or more liquid streams therethrough. At least one outer tubular flow member having first and second ends concentrically disposed about and spaced from said inner tubular flow member is provided to form at least one fluid stream flow annulus about the inner tubular member for separately receiving another of the two or more liquid streams into the annulus for flow therethrough. An orifice mixing plate is sealably connected to the outer most tubular flow members at its second end of the outer tubular flow member and has an opening in fluid communication with the second end of the inner tubular flow member and at least one outer tubular flow member. The opening of the orifice mixing plate is provided with a sufficient inwardly taper toward the concentric axis of the tubular flow members to provide turbulent mixing of the fluids passing therethrough from the second ends of the tubular members. A heater is disposed about the outer most one of the tubular flow members to preheat all of the fluid streams flowing through the tubular members to a selected temperature prior to mixing and injection into the chemical reactor. By the use of an independent preheating of the gaseous reactants prior to mixing and injecting the gaseous reactants into a high temperature chemical reactor, an improved process for conversion of $UF_6$ to uranium oxides is provided.

This design allows use of ceramic and speciality alloy materials for high temperature service with particularly corrosive halide feeds, such as $UF_6$ and HF. The combination of the orifice mixing plate and external heater provides for a controlled temperature of preheat while limiting the maximum temperature of reaction which makes the multicomponent feed apparatus especially useful and efficient in a high temperature chemical reactor for converting $UF_6$ to $UO_2$, wherein the apparatus materials properties (corrosion, strength, vapor pressure, etc.) are maintained within allowable service values for dependable use.

DESCRIPTION OF THE PREFERRED EMBODIMENTS

The multicomponent feed apparatus of this invention separately preheats, then mixes, and injects feed components directly into a variety of high temperature tubular, fixed and fluidized bed, and kiln chemical reactors. In the preferred installation, the feed apparatus is mated directly to the top, side, or bottom of the reactor and the hot mixed feed injected directly into the reactor cavity. Multiple feed systems can be used to feed a single reactor. The feed apparatus is assembled by using nested tubular elements to provide two, three, or more independent flow channels for various feed streams. Feed streams of similar composition can be fed through more than one flow channel to facilitate better contacting of reactants. The feed tubes can discharge at the same or different locations along the common axis of the nested tubular assembly to control the sequence or order of stream mixing. The feed tube materials of construction are selected to be chemically compatible with the process feeds at the maximum temperature of operation. Alumina tubes have been found to be quite chemically compatible in the high temperature conversion of $UF_6$ to uranium oxides when conducted in the multicomponent feed apparatus of this invention; other suitable materials of construction include $CaF_2$, yttria stabilized $ZrO_2$, $LaB_2$, and spinel ($MgO \cdot Al_2O_3$). The tubular elements are assembled into a unit using standard design tubing fittings with ferrules, o-rings, or other mechanical means, flanges, or other well-known and commonly used pipe and tubing fittings. Moderate temperatures (i.e., <300° C.) allow use of fluorocarbon polymers or other soft seal materials at the inlet or lower temperature end of the feed apparatus, specifically without need for welds or large mechanical or thermal stresses. The high temperature discharge end of the apparatus is not connected and free to move without mechanical stresses due to thermal expansion effects.

The tubular assembly is mounted inside a temperature controlled high temperature furnace with heat transfer by radiation and with the assembly seals outside the furnace at a moderate temperature. A variety of common heating systems can be used such as a resistance tube furnace or induction heater. The fluids flowing through the tubular elements are heated by conduction-convection from the radiantly heated walls.

The diameters and lengths of the tubes are selected to assure the preheat needed to achieve a certain minimum feed temperature necessary to initiate a particular chemical reaction or series of reactions and to deliver the feeds at a point inside the reactor with a configuration selected for intimate mixing. Furnace temperature should preferably be greater than 500° C. to give high rates of heat transfer to the feed tubes by radiation. Fluid preheat temperatures should preferably be within a few degrees of and up to about 100° C. of the furnace temperatures depending on the feed flow rates, the feed tube lengths and diameters, and other variables including radiation emissivities, surface roughness, and area for heat transfer.

Mixing is promoted by designing the feed apparatus for higher velocities and pressure drops at the discharge openings. Highly efficient mixing is provided, and is preferred, by the use of an integral orifice mixing plate strategically positioned at the discharge end of the preheat tubes prior to injection into the reactor. The orifice configuration can be selected to achieve more or less restriction on the component flows and thereby control the extent of feed gas turbulence at the reactor injection point.

While the present invention is illustrated with all-gaseous feeds, those skilled in the art will readily recognize that the invention could be equally applicable to liquid or solid feeds that would flow by pressure drop or gravity to the chemical reactor without caking or plugging in the feed channels.

BRIEF DESCRIPTION OF THE DRAWINGS

The invention is further described by reference to the accompanying drawings wherein.

Figure 1:
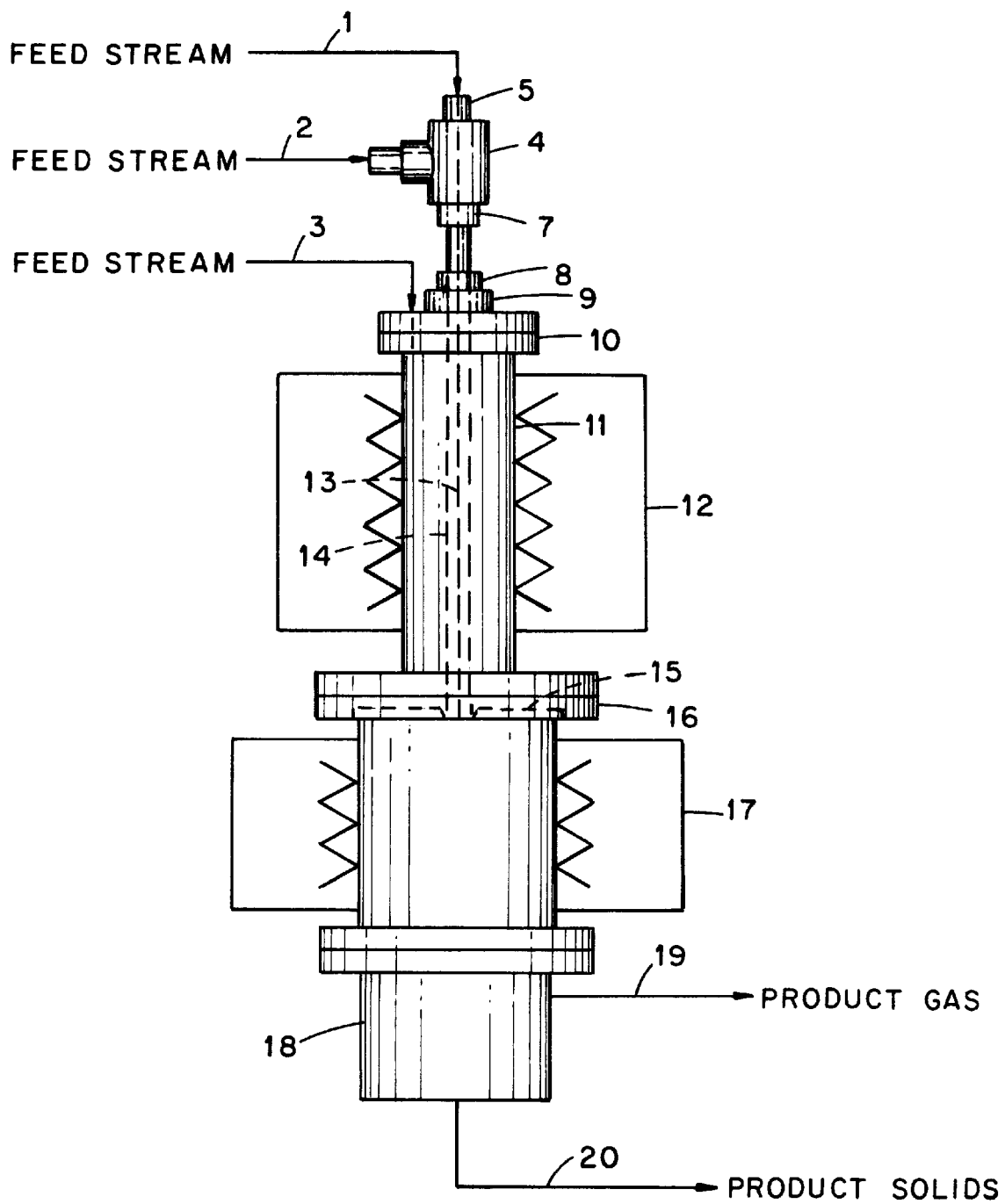
FIG. 1 diagrammatically shows a multicomponent feed apparatus for preheating and mixing three feed streams prior to injection into the top of a high temperature tubular chemical reactor.
Figure 2:
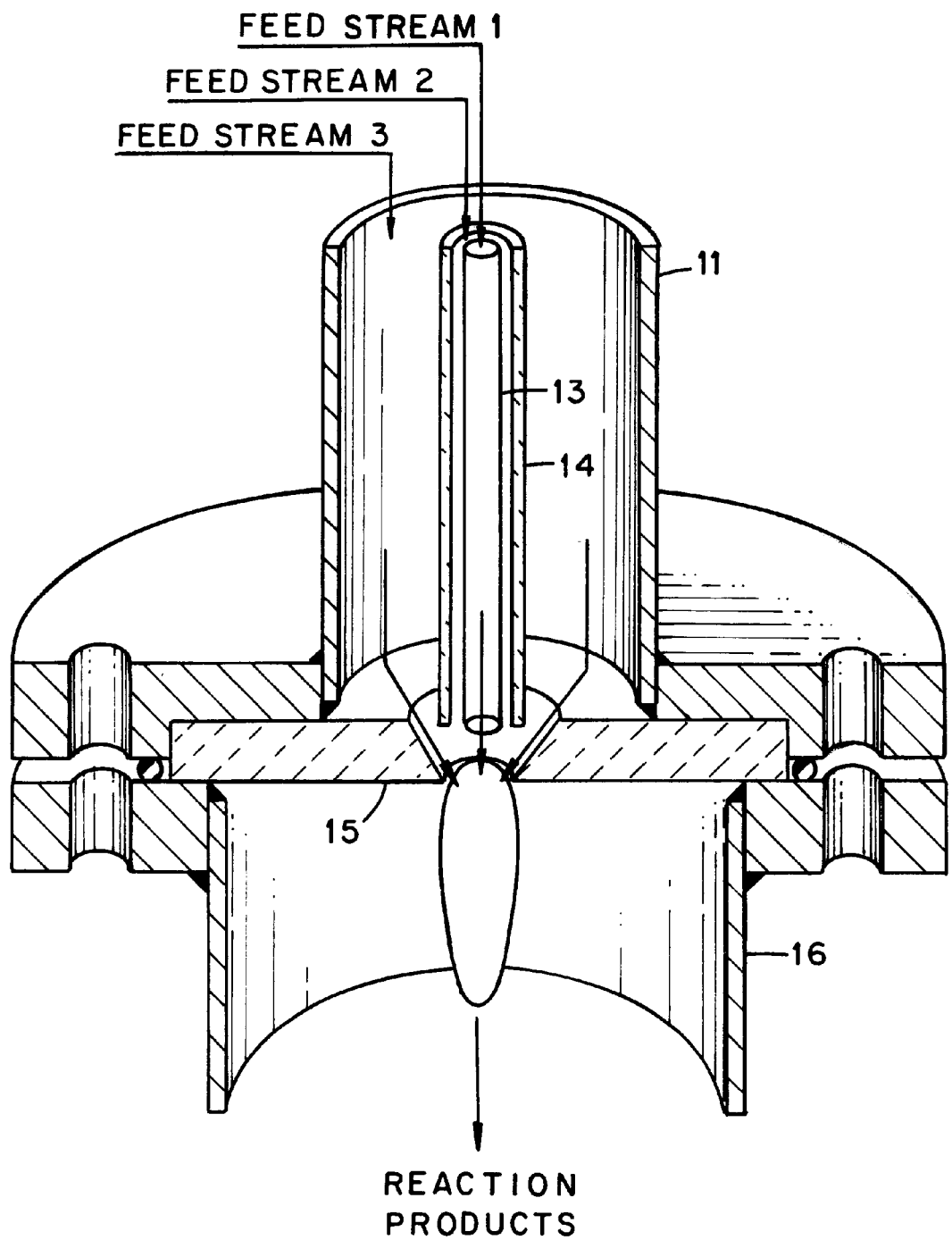
FIG. 2 shows the internal details of the feed preheater and mixing orifice assembly of the multicomponent feed apparatus given in FIG. 1.

With specific reference to FIGS. 1 and 2, the subject multi-stream feed apparatus (10) is mounted on the top of high temperature chemical reactor (16) to preheat and then mix streams (1), (2), and (3) prior to injection into the reaction zone of reactor (16). While the example shows a three component feed device, it should be apparent to those skilled in the art that additional nested feed tubes are possible for additional feed streams. Also, the composition of stream (1) can be essentially the same as stream (3) to enhance mixing of the reactants of streams (1) and (3) with stream (2). Product gases (19) are withdrawn from the bottom of the reactor. Residual product solids (20) are collected in the reactor bottom vessel (18) and subsequently withdrawn from the reactor. The feed apparatus consists of two ceramic feed tubes (13) and (14) mounted inside metal pipe (11), discharging three feed streams through mixing orifice (15). Stream (1) is fed to the center feed tube (13) of apparatus (10), while stream (2) is fed to the annulus formed by feed tube (13) nested inside feed tube (14). Stream (3) is fed through the outer annulus of apparatus (10) formed by the feed tube (14) nested inside metal pipe (11). Normally, the discharge point of the center feed tube (13) will be approximately the same as the middle feed tube (14). However, the discharge end of the center feed tube (13) can be recessed in relationship to feed tube (14) to allow premature or early mixing of feed stream (1) and stream (2)

and then mixing of the combined streams (1) and (2) with stream (3) at the discharge point to the chemical reactor (16). Feed tube (13) is constructed from a material that is essentially chemically inert or forms a protective film with stream (1) on the inside and stream (2) on the outside at the maximum operating temperature of the device. Feed tube (14) is constructed from a material that is essentially chemically inert or forms a protective film with stream (2) and stream (3) at the preheat temperature. The metal pipe (11) is constructed from a material that is inert with stream (3). The dimensions of the mixing orifice (15) and position of the feed tube discharge relative to the orifice assure the desired level of feed component mixing just prior to injection into the reactor (16). The feed apparatus is heated by resistance heater (12) while the reactor is heated independently by resistance heater (17). The reactor heater (17) may operate at a different temperature than the feed preheater or resistance heater (12). Ceramic feed tube (14) mounts to the top flange (9) of the feed apparatus (10) with compression tube fitting (8). The inner or center feed tube (13) mounts to the top of feed tube (14) with tubing tee (4), with compression fitting (7) connected to tube (14) and compression fitting (5) connected to tube (13). The compression fittings reside outside the heated zone of heater (12) and not subject to the high temperature of the preheater (12). The chemical composition of stream (1) may be identical to stream (3) for more efficient contacting and reaction of stream (2).

Figure 3:
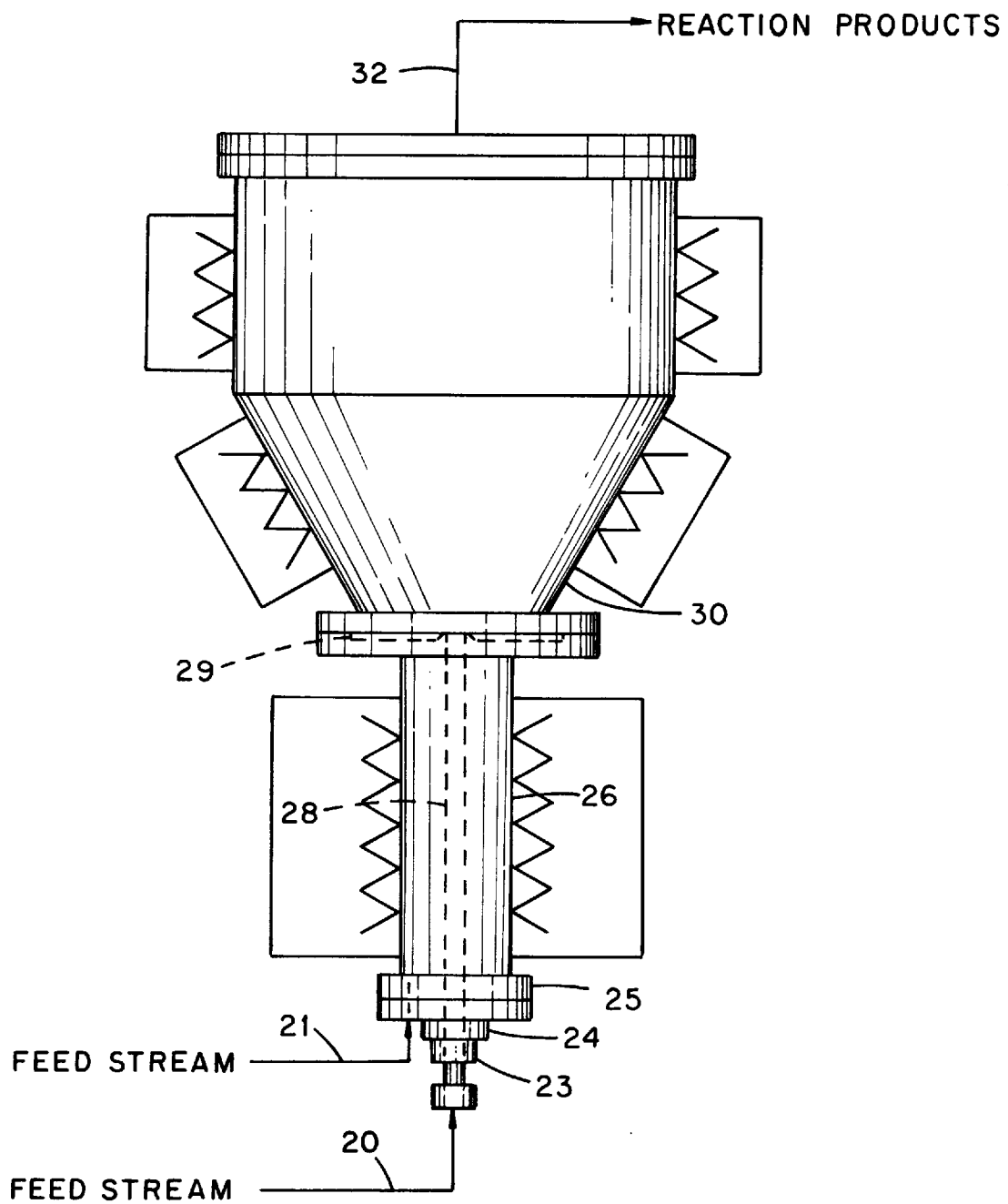
FIG. 3 diagrammatically shows the feed apparatus for preheating and mixing two feed streams prior to injection into the bottom of a high temperature fluid bed reactor.
Figure 4:
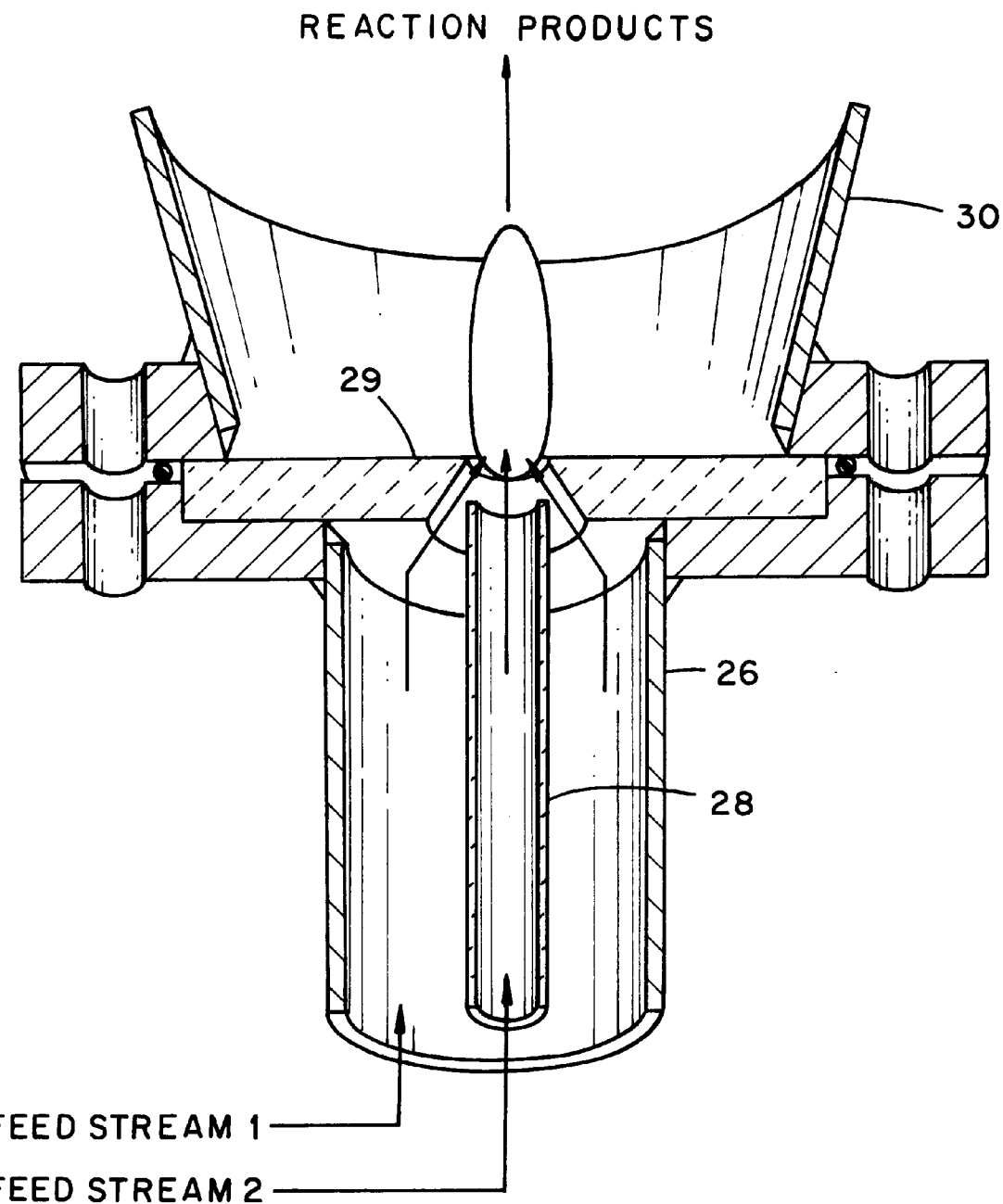
FIG. 4 shows the internal details of the feed preheater and mixing orifice assembly of the two feed apparatus given in FIG. 3.

With specific reference to FIGS. 3 and 4, a two-stream feed apparatus (25) is mounted on the bottom of high temperature fluid bed reactor (30) to preheat and then mix streams (20) and (21) prior to injection into the reaction zone of reactor (30). Product gases (32) are withdrawn from the top of the reactor. The feed apparatus consists of a single ceramic feed tube (28) mounted inside metal pipe (26), discharging two feed streams through mixing orifice (29). Stream (20) is fed to the center feed tube (28) of apparatus (25), while stream (21) is fed through the annulus of the metal pipe (26). Feed tube (28) is constructed from a material that is essentially chemically inert or forms a protective film with stream (20) and stream (21) at the maximum operating temperature of the device. The metal pipe (26) is constructed from a material that is inert with stream (21). The dimensions of the mixing orifice (29) and position of the feed tube discharge relative to the orifice assure the desired level of feed component mixing just prior to injection into the fluid bed (30). Ceramic feed tube (28) mounts to the bottom flange (24) of the feed apparatus (25) with compression tube fitting (23).

The invention is illustrated by the following examples:

EXAMPLE 1

A chemical reactor for the high temperature conversion of $UF_6$ gas into uranium oxides and RF was fed as follows: the feed apparatus was assembled using a 0.5 inch O.D. by 48 inches long $Al_2O_3$ tube contained in a 1 inch O.D. by 40 inches long $Al_2O_3$ tube (see FIG. 1). Both ceramic feed tubes were positioned in a 3 inch Sch 10 Inconel pipe reactor with top flange and 1 inch tubing fitting for securing the feed tubes. The assembly was contained in a resistance heated tube furnace operated at 950° C. The heated length was 35.5 inches. The feed flow to the inner tube was 1060 sccm $UF_6$, 320 sccm $O_2$, and 2000 sccm Ar. The feed flow to the annulus was 2760 sccm $H_2$, 2330 sccm $H_2O$ vapor, and 1000 sccm Ar. The preheated and mixed gas flows were injected directly into the top of the chemical reactor. The solid products leaving the bottom of the reactor were identified by X-ray diffraction as predominantly $UO_2$ (as particulates). The product gas leaving the bottom of the reactor was determined to be HF by infrared analysis. The alumina feed tubes showed no weight loss due to reaction with $UF_6$.

This example demonstrated that with an independent and separate preheating of the feed gases prior to mixing and injection into the reactor the high temperature conversion of $UF_6$ to uranium oxides, here predominately $UO_2$, could be successfully and efficiently carried out simply by direct injection of the reactant gases into the reactor.

EXAMPLE 2

The chemical reactor described in Example 1 was used to convert $UF_6$ gas into uranium oxides and HF utilizing the same feed apparatus with identical reactant gases and flow rates, except the preheater tube furnace was operated at 850° C. instead of 950° C.

The solid products leaving the bottom of the reactor in this case were identified by X-ray diffraction as primarily $UO_2$ and $UF_4$. The product gas was determined to be HF by infrared analysis. The alumina feed tubes showed no weight loss due to reaction with $UF_6$.

This Example demonstrates the importance of having sufficient reactant preheat prior to mixing to avoid the accumulation of the uranium intermediate, $UF_4$.

EXAMPLE 3

The same feed apparatus used in the first two examples was mated to a larger chemical reactor for conversion of $UF_6$ to uranium oxides and HF. The reactor was fabricated from a 4 inch Sch. 10 Inconel pipe in this case. The resistance heated tube furnace was operated at 950° C. The flow rates were: 2120 sccm $UF_6$, 640 sccm $O_2$, 5510 sccm $H_2$, and 4670 sccm $H_2O$.

The solid products leaving the bottom of the reactor were identified by X-ray diffraction as predominately $UO_2$ (as particulates). The product gas leaving the bottom of the reactor was determined to be HF by infrared analysis. The alumina feed tubes showed no weight loss due to reaction with $UF_6$.

This Example demonstrated the flexibility of a single design feed apparatus adapted to a larger chemical reactor with significantly higher stream flows.

What is claimed is:

1. In combination with a high temperature chemical reactor for conversion of $UF_6$ to uranium oxide solids and HF including a reaction chamber, at least one feed port for receiving fluids to be reacted therein, a heating means in relationship to said reaction chamber for heating incoming fluids, and an exit port for removing reaction products from said reaction chamber, a multicomponent fluid feed apparatus, to the at least one feed port, for preheating and mixing at least two fluid streams being injected into said high temperature chemical reactor, said multicomponent fluid apparatus comprising:

an inner tubular flow member having first and second ends, said first end thereof disposed for receiving one of said at least two fluid streams to flow therethrough;

at least one outer tubular flow member having first and second ends concentrically disposed about and spaced from said inner tubular flow member to form at least one fluid stream flow annulus about said inner tubular member for separately receiving another one of said at least two fluid streams into said annulus for flow therethrough;

an orifice mixing plate sealably connected to said at least one outer tubular flow member at said second end thereof and having an opening therein in fluid communication with said second ends of said inner and said at least one outer tubular flow member, said opening being sufficiently tapered inwardly toward the concentric axis of said inner and outer tubular flow members to provide turbulent mixing of said fluid streams passing therethrough from the second ends of said inner and outer tubular flow members into said chemical reactor;

a heating means disposed about said at least one outer tubular member for heating all of said fluid streams flowing through said inner and outer tubular members to a selected temperature approximating the reaction temperature of the fluid streams in the high temperature reactor prior to mixing and injecting into said chemical reactor.

2. The combination as set forth in claim 1 wherein said at least one outer tubular flow member includes a plurality of outer tubular flow members concentrically disposed about said inner tubular flow member in a radially outward direction from the concentric axis of orientation of said tubular flow members to form a plurality of parallel flow annuli about said inner tubular flow member in fluid communication with said opening in said orifice mixing plate.

3. The combination as set forth in claim 1 wherein said chemical reactor is a thermal chemical reactor for conversion of $UF_6$ gas into uranium oxides and HF, further including a first fluid supply means for supplying a first fluid stream formed of $UF_6$ or a mixture of $UF_6$ and $O_2$ gases to one of said inner or outer tubular flow members and a second fluid supply means for supplying a second fluid stream formed of a combination of gases containing hydrogen selected from the group consisting of $H_2$, $H_2O$, $NH_3$, and $CH_4$ and oxygen in a combined form selected from the group consisting of $H_2O$ and $CO_2$ to the other of said inner or outer tubular flow members.

4. The combination as set forth in claim 3 wherein said first fluid supply means is connected in fluid communication with said inner tubular member and said second fluid supply means is connected in fluid communication with said outer tubular member.

5. The combination as set forth in claim 4 wherein said tubular members are formed of materials that are essentially chemically inert to the respective streams of gases flowing therethrough at said selected preheating temperature.

6. The combination as set forth in claim 5 wherein said inner tubular member and said outer tubular members are formed of ceramic material suitable for corrosive gas operation at preheating temperatures in the range of from about 500 to 1000° C.

7. The combination as set forth in claim 6 wherein said inner tubular member, said outer tubular members and said orifice plate are formed from a ceramic material selected from the group consisting of $Al_2O_3$, $CaF_2$, yttria stabilized $ZrO_2$, $LaB_6$ and spinel ($MgO \cdot Al_2O_3$).

8. The combination as set forth in claim 1, wherein said chemical reactor is a thermal chemical reactor for conversion of $UF_6$ gas into uranium oxides and HF wherein said at least one outer tubular flow member includes two outer tubular flow members, thereby forming first and second separate annular fluid flow channels about said inner tubular flow member and further including a first fluid supply means for supplying a first stream of gases formed of $UF_6$ to said inner tubular flow member, a second fluid supply means for supplying a second stream of gases formed of $O_2$ to said first annular fluid flow channel and a third fluid supply means for supplying a third stream of gases formed of a combination of gases containing hydrogen selected from the group consisting of $H_2$, $H_2O$, $NH_3$, and $CH_4$ and oxygen in a combined form selected from the group consisting of $H_2O$ and $CO_2$ to said second annular fluid flow channel.

9. The combination as set forth in claim 1, wherein said chemical reactor is a thermal chemical reactor for conversion of $UF_6$ gas into uranium oxides and HF wherein said at least one outer tubular flow member includes two outer tubular flow members, thereby forming first and second separate annular fluid flow channels about said inner tubular flow member and further including a first fluid supply means for supplying a first stream of gases formed of a combination of gases containing hydrogen selected from the group consisting of $H_2$, $H_2O$, $NH_3$, and $CH_4$ and oxygen in a combined form selected from the group consisting of $H_2O$ and $CO_2$ to said inner tubular flow member, a second fluid supply means for supplying a second stream of gases formed of $UF_6$ and $O_2$ to said first annular fluid flow channel and a third fluid supply means for supplying a third stream of gases formed of a combination of gases containing hydrogen selected from the group consisting of $H_2$, $H_2O$, $NH_3$, and $CH_4$ and oxygen in a combined form selected from the group consisting of $H_2O$ and $CO_2$ to said second annular fluid flow channel.

10. The combination as set forth in claim 1, wherein said chemical reactor is a thermal chemical reactor for conversion of $UF_6$ gas into uranium oxides and HF wherein said at least one outer tubular flow member includes two outer tubular flow members, thereby forming first and second separate annular fluid flow channels about said inner tubular flow member and further including a first fluid supply means for supplying a first stream of gases formed of $UF_6$ to said inner tubular flow member, a second fluid supply means for supplying a second stream of gases formed of $H_2O$ to said first annular fluid flow channel and a third fluid supply means for supplying a third stream of gases formed of $H_2$ to said second annular fluid flow channel.

11. The combination as set forth in claim 1, wherein said heating means extends over substantially the entire length of said tubular flow members and wherein said tubular flow members are of a length sufficient to provide said selected temperature of said process fluids passing therethrough prior to injection into said reactor.

12. The combination as set forth in claim 1, wherein said second end of said inner tubular flow member extends into said tapered opening of said orifice mixing plate a selected distance depending on the selected location of mixing of said fluids passing through said tapered opening in said orifice mixing plate.

13. The combination as set forth in claim 1, wherein said at least one outer tubular flow member includes two outer tubular flow members, thereby forming first and second separate annular fluid flow channels about said inner tubular flow member.

14. The combination as set forth in claim 13, wherein said second ends of said inner tubular flow member and said first annular flow channel extends into said tapered opening of said orifice mixing plate a selected distance depending on the selected location of mixing of said fluids passing through said tapered opening in said orifice mixing plate.

* * * * *